(12) United States Patent  (10) Patent No.: US 9,367,721 B2
Detwiler  (45) Date of Patent: Jun. 14, 2016

(54) IMAGING OPTICAL CODE SCANNER WITH CAMERA REGIONS

(71) Applicant: Paul Oliver Detwiler, Lawrenceville, GA (US)

(72) Inventor: Paul Oliver Detwiler, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 14/103,394

(22) Filed: Dec. 11, 2013

(65) Prior Publication Data

US 2015/0161428 A1  Jun. 11, 2015

(51) Int. Cl.
G06K 7/10 (2006.01)
(52) U.S. Cl.
CPC .......... *G06K 7/10831* (2013.01); *G06K 7/1096* (2013.01)
(58) Field of Classification Search
CPC .................................................. G06K 7/10831

USPC ............................................. 235/440, 462.41
See application file for complete search history.

(56) References Cited

U.S. PATENT DOCUMENTS

| | | | |
|---|---|---|---|
| 2007/0297021 A1* | 12/2007 | Smith | 358/474 |
| 2010/0163628 A1* | 7/2010 | Olmstead | G06K 7/10702 235/470 |
| 2010/0252635 A1* | 10/2010 | Drzymala et al. | 235/462.41 |
| 2013/0134218 A1* | 5/2013 | Gregerson | 235/440 |
| 2013/0181051 A1* | 7/2013 | Olmstead et al. | 235/440 |

\* cited by examiner

*Primary Examiner* — Toan Ly
(74) *Attorney, Agent, or Firm* — Harden E. Stevens, III; Schwegman, Lundberg & Woessner (57) ABSTRACT

An imaging optical code scanner is presented that includes improved vertical optics for capturing images of items being presented for scanning. The improvements include multiple image capture devices, multiple illumination modules and viewing of items being scanning from four different directions. This allows for high pass-by scanning of items.

19 Claims, 6 Drawing Sheets

FIG. 1

FIG. 2A BACK VIEW

FIG. 2B LEFT SIDE VIEW

FIG. 2C RIGHT SIDE VIEW

FIG. 2D TOP SIDE VIEW

FIG. 2E BOTTOM SIDE VIEW

IMAGING OPTICAL CODE SCANNER WITH CAMERA REGIONS

FIELD OF THE INVENTION

The present invention relates to optical code scanners and more specifically to improvements to the vertical optics of an imaging optical code scanner.

BACKGROUND

Optical code scanners are used to read optical codes and the information encoded therein. Optical code scanners may suitably be combined with other apparatuses or systems that use optical codes. For example, an optical code scanner can be integrated with a point of sale (POS) terminal to read optical codes on items which are presented to the POS terminal for purchase as part of a purchase transaction.

An optical code scanner may suitably be operated in a pass-by mode where items are passed by the scanner for reading. Imaging based optical code scanners capture images from a scanning volume which is located above the optical code scanner and through which items are passed for scanning. The captured images are processed to identify and recover optical code data for any optical code that appears in the images. Imaging based optical code scanners process more data and thus take longer to read an optical code than laser based optical code scanners, however imaging based optical code scanners can read many different types of optical codes that cannot be read by laser based technology. Companies that use optical code scanners typically require high pass-by scanning speeds and are beginning to require optical code scanners that are able to read optical code formats not readable by laser based optical code scanners.

SUMMARY

Among its several aspects, the present invention seeks to overcome or ameliorate at least one of the disadvantages of the prior art, or to provide a useful alternative.

Among its several aspects, the present invention recognizes that there is an advantage to using image based scanning technology to scan and decode optical codes because the technology can read a wide variety of different optical code types such as one dimensional and two dimensional bar codes.

The invention further recognizes the performance benefits of capturing images from multiple different directions as an item is moved through a scanning volume of an optical code scanner.

The invention additionally recognizes the performance benefits of providing illumination of the scanning volume from a plurality of different directions where the illumination from each direction is independently controlled.

In accordance with an embodiment of the present invention, there is provided an optical code scanner with improved vertical optics and image capture devices. The optical code scanner comprises: a vertical housing including an optically transparent vertical window facing an item scanning volume of the optical code scanner; a plurality of secondary fixed mirrors located within and attached to the vertical housing; a plurality of three image capture devices and a plurality of primary fixed mirrors all attached to a camera module that is located within and attached to the vertical housing where the plurality of secondary fixed mirrors are positioned to direct images from four regions of the item scanning volume of the optical code scanner to the plurality of primary fixed mirrors and to the plurality of three image capture devices; a plurality of illumination modules that direct generated light to the four regions of the item scanning area; and a digital memory wherein computer instructions are stored; and a computer processor in communication with the memory where when the processor executes the computer instructions, the computer instructions cause the processor to perform the following steps: causing each of the plurality of three image capture devices to capture images from one of the four regions of the item scanning area where no two images are captured at the same time and at least one image is captured from each of the four regions; causing each of the four regions to be illuminated by one or more of the plurality of illumination modules when an image is being captured; and processing the images to read an optical code.

In accordance with an embodiment of the present invention, there is provided a method of operating an optical code scanner with improved vertical optics and image capture devices. The method is implemented by a digital processor located within the optical code scanner. The method comprises the steps of: causing each of three image capture devices to capture images from one of four regions of an item scanning area of the optical code scanner where no two images are captured at the same time and at least one image is captured from each of the four regions; causing each of the four regions to be illuminated by one or more of the plurality of illumination modules when an image is being captured; and processing the captured images to read an optical code.

A more complete understanding of the present invention, as well as further features and advantages of the invention, will be apparent from the following Detailed Description and the accompanying Drawings.

BRIEF DESCRIPTION OF THE DRAWINGS

The present invention may take form in various components and arrangement of components and in various methods. The drawings are for purposes of illustrating example embodiments and alternatives and are not to be construed as limiting the invention. The drawings are not necessarily drawn to scale. Throughout the drawings, like element numbers are used to describe the same parts throughout the various drawings, figures and charts.

DETAILED DESCRIPTION

In the following description, numerous details are set forth to provide an understanding of the claimed invention. However, it will be understood by those skilled in the art that aspects of the claimed invention may be practiced without utilizing all of these details and that numerous variations or modifications from the described embodiments are possible and envisioned.

Figure 1:
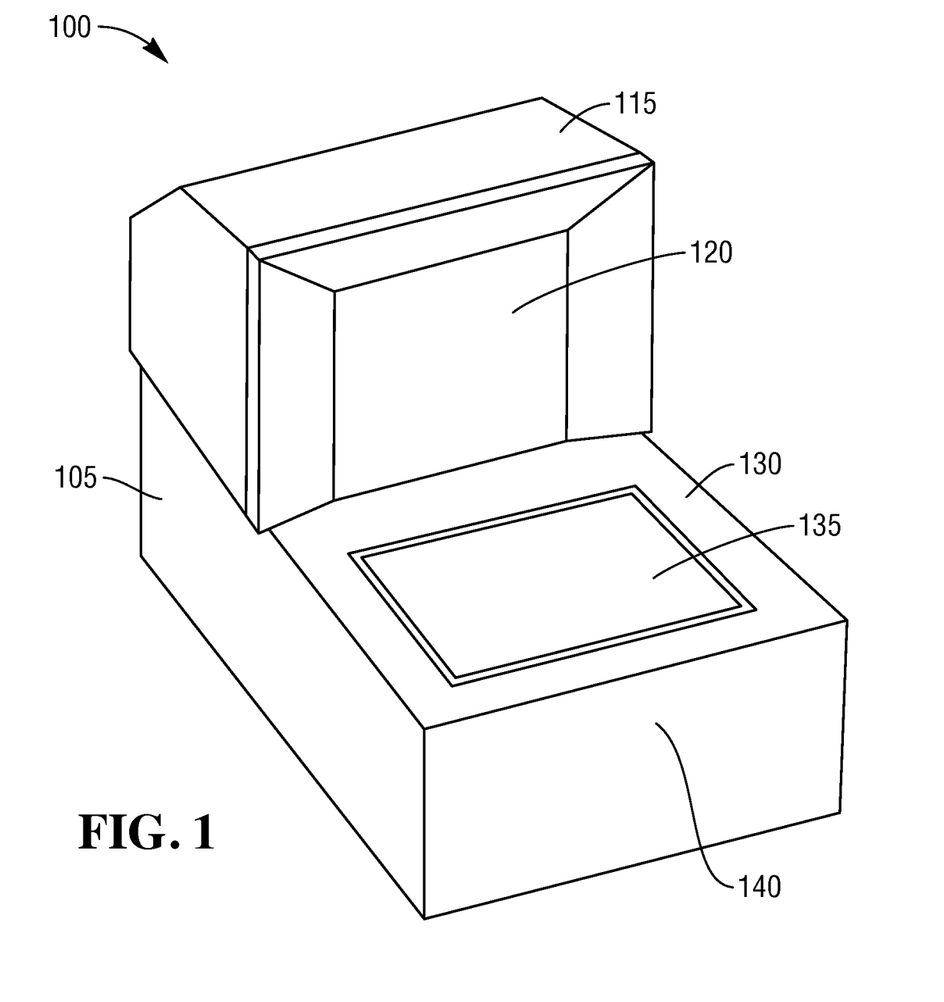
FIG. 1 is a high-level drawing illustrating an optical code scanner of the present invention.
Figure 2A:
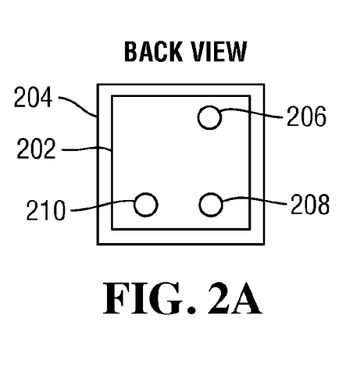
FIGS. 2A-2E are high-level cross-sectional drawings illustrating a camera module of the optical code scanner.
Figure 2B:
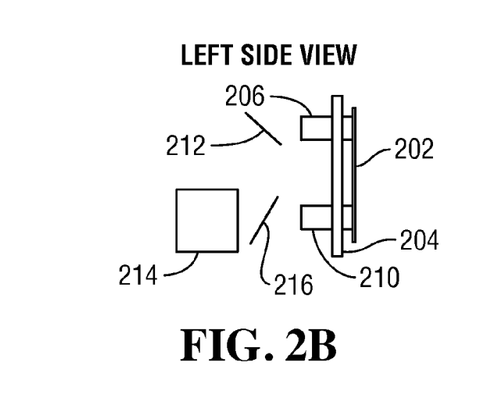
Figure 2C:
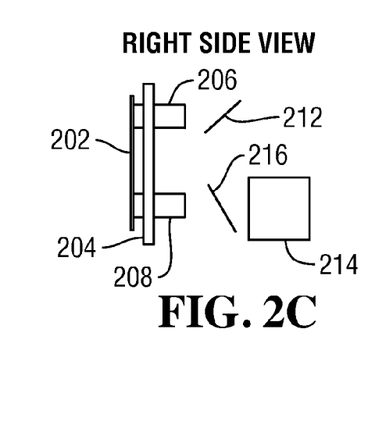
Figure 2D:
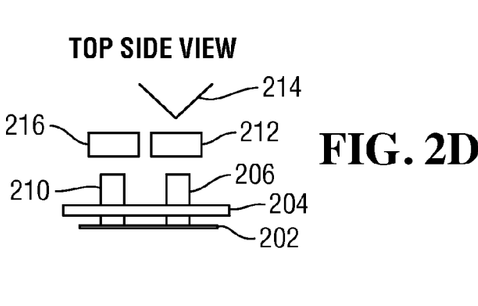
Figure 2E:
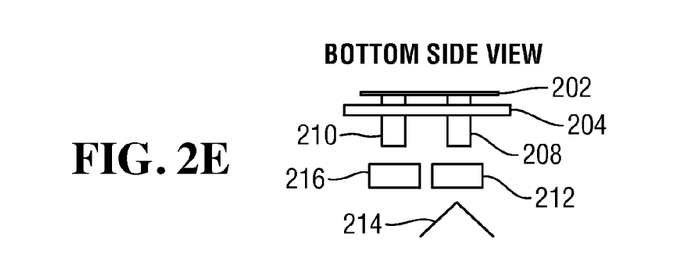

Referring to FIG. 1, there is provided a high-level drawing illustrating an exemplar embodiment of an optical code scanner ("scanner") 100. The optical code scanner 100 reads optical codes presented to the optical code scanner 100. An optical code is a computer readable representation of information. Optical codes can be attached to or printed on an item or object or displayed on an electronic display, such as the display screen of a cell phone or tablet computer or the like. The optical codes may suitably include, but are not limited to, one dimensional and two dimensional bar codes. The optical code scanner 100 can read optical codes based on symbologies that include but are not limited to: PDF417, UPS, EAN, Code 128, GS1 DataBar™, Data Matrix, Aztec, QR and MaxiCode.

The scanner 100 is located within a housing 105. The housing 105 includes a vertical housing component 115 and a horizontal housing component 130. The scanner 100 includes a horizontal scanning window 135 and a vertical scanning window 120. The horizontal scanning window 135 is housed in the horizontal housing component 130. The vertical scanning window 120 is housed in the vertical housing component 115 of the scanner 100 and faces an operator side 140 of the scanner 100. The side of the vertical housing component 115 that houses the vertical scanning window 120 is the front of the scanner 100 and faces the operator of the scanner 100. The two scanning windows 120, 135 are composed of an optically transparent material such as hurricane glass, sapphire coated glass or the like. The horizontal scanning window 135 also acts as a weigh plate for a weigh scale (FIG. 4, 435) that is housed within the horizontal housing component 130.

An operator scans an item by orienting an optical code on an item or device so it faces the vertical scanning window 120 and then moves the item past the scanning vertical window 120. The scanner 100 produces one or more indications to the operator, such as an audio sound, a light or both, once the optical code has been identified and read. The scanner 100 uses imaging technology to capture images of the optical code which are processed to decode the information stored in the optical code.

In this embodiment, the scanner 100 is illustrated with the vertical scanning windows 120 and the horizontal scanning windows 135 but only the vertical scanning window 120 is used for scanning items. In other embodiments, two, three or more scanning windows are used to implement the scanner 100 where scanning devices are located behind each scanning window. The scanner 100 is a fixed scanner which means it remains in a fixed location when in operation.

In some embodiments, the scanner 100 is part of a self-service checkout terminal where the operator would generally be a customer that is scanning items for purchase. In other embodiments, the scanner 100 is part of an assisted checkout terminal where the operator is generally an employee that is trained to operate the terminal and conduct a purchase transaction for a customer. In some embodiments, the scanner 100 is part of a terminal that can be configured to at times be a self-service checkout terminal and at other times be an assisted checkout terminal. In still other embodiments, the scanner 100 is part of a tracking system where the scanner 100 is used to identify items that pass by the scanner 100. An operator may still scan the items or the items may be automatically moved past the scanner 100 on a conveyor belt or the like. Examples of these types of systems include but are not limited to: inventory management systems, item routing systems, item sorting systems, mail or package sorting systems and the like.

Referring now to FIGS. 2A-2E, there are provided high-level cross-sectional drawings of a camera assembly 200 used in the optical code scanner 100. The camera assembly 200 includes a first, second and third image capture devices 206, 208 and 210 respectively. The image capture devices 206, 208, 210 each include a complementary metal oxide semiconductor (CMOS) black and white image sensor with a resolution of 1280×960 and 1.3 megapixels. In other embodiments, the image sensors are color sensors with a different resolution. Each of the image capture devices 206, 208, 210 is mounted on a printed circuit board 202 which is mounted to a camera housing 204. The camera housing 204 further supports a first, second and third set of primary mirrors 212, 214, 216 that are used to reflect images from four different directions to the image capture devices 206, 208, 210. The camera housing 204 is mounted to the inside rear of the vertical housing component 115 such that the image capture devices 206, 208, 210 face the vertical scanning window 120. Each of the image capture devices 206, 208, 210 further includes focusing components that properly focus incoming images onto the image sensor for capture.

Each of the image capture devices 206, 208, 210 receives and captures images from one or more different directions. The first image capture device 206 captures a top/down image using the first primary mirror 212. The second image capture device 208 captures two images directed from opposite sides of the vertical housing component 115. These two images represent the leading and trailing views of an item being scanned. The two images are directed to the second image capture device 208 by the second primary mirror 214 which is actually a two mirror assembly. When the second image capture device 208 receives an image from the second primary mirror 214, half the image is from one direction and the other half of the image is from another direction. The captured image may be processed as two different images or one combined image. The third image capture device 210 captures a vertical image using the third primary mirror 216. The vertical image is directed from the lower portion of the vertical housing component 115. The vertical image is captured in portrait format where the image is taller than it is wide. All images captured by the image capture devices 206, 208, 210 are received through the vertical scanning window 120.

The three image capture devices 206, 208, 210 preferably may be implemented using image sensors that are based on complementary metal oxide semiconductor (CMOS) technology. In some embodiments, other types of image sensor technology are used such as charged-coupled device (CCD) technology. Each of the image capture devices 206, 208, 210 captures an electronic image of an optical image directed to the device. The electronic image is captured in the form of digital image data that represents the intensity of light received by each pixel of each image capture device 206, 208, 210. In this embodiment, black and white image sensors are used. This reduces the cost of the sensors and reduces the amount of data that must be processed. Additionally, each of the image capture devices 206, 208, 210 is implemented using a global shutter which allows the image sensor of an image capture device to capture all pixel data simultaneously. This reduces image smearing and blurring and reduces the amount of illumination required to capture a clear image.

Figure 3A:
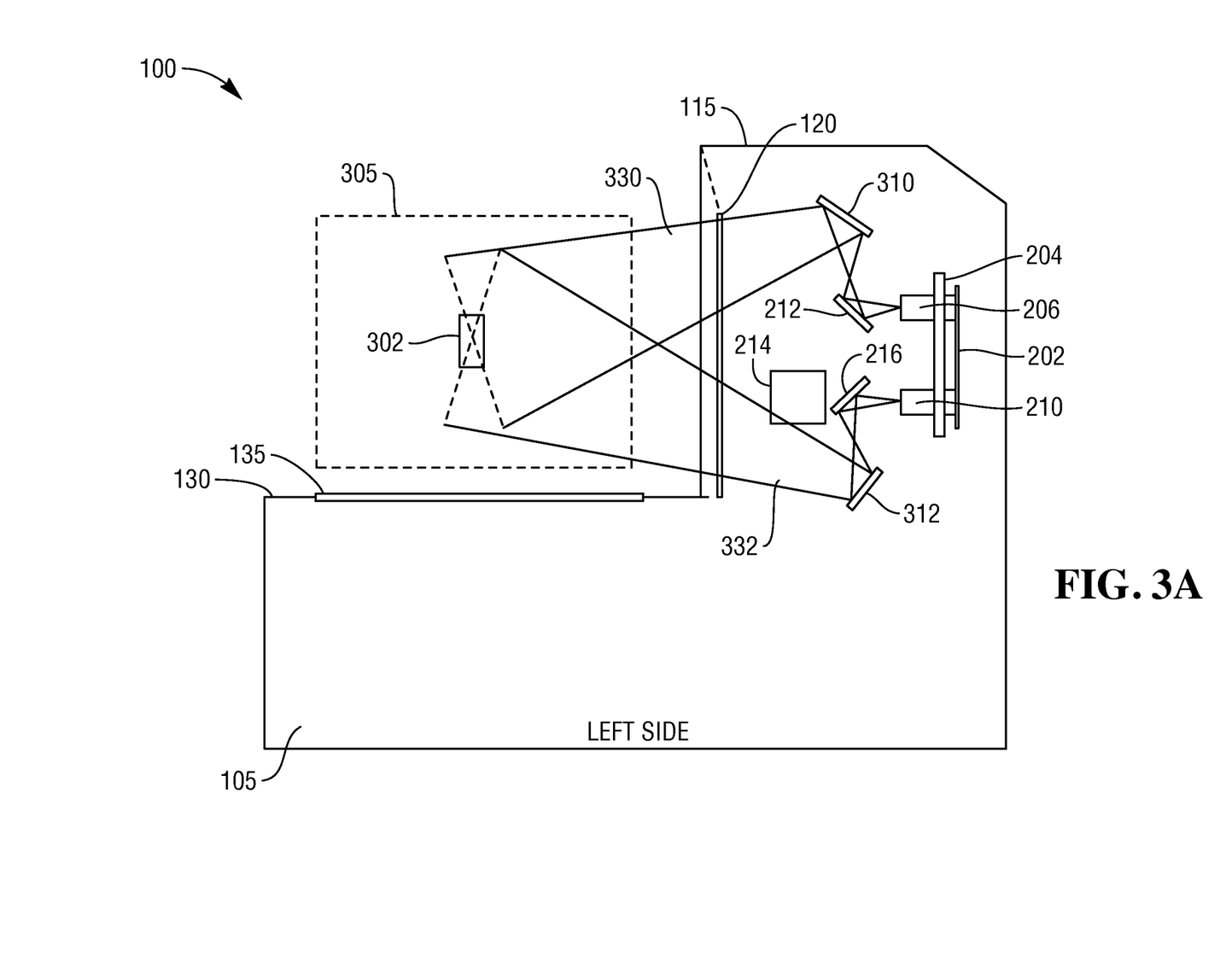
FIGS. 3A-3B are high-level cross-sectional drawings illustrating different views of the optical code scanner.
Figure 3B:
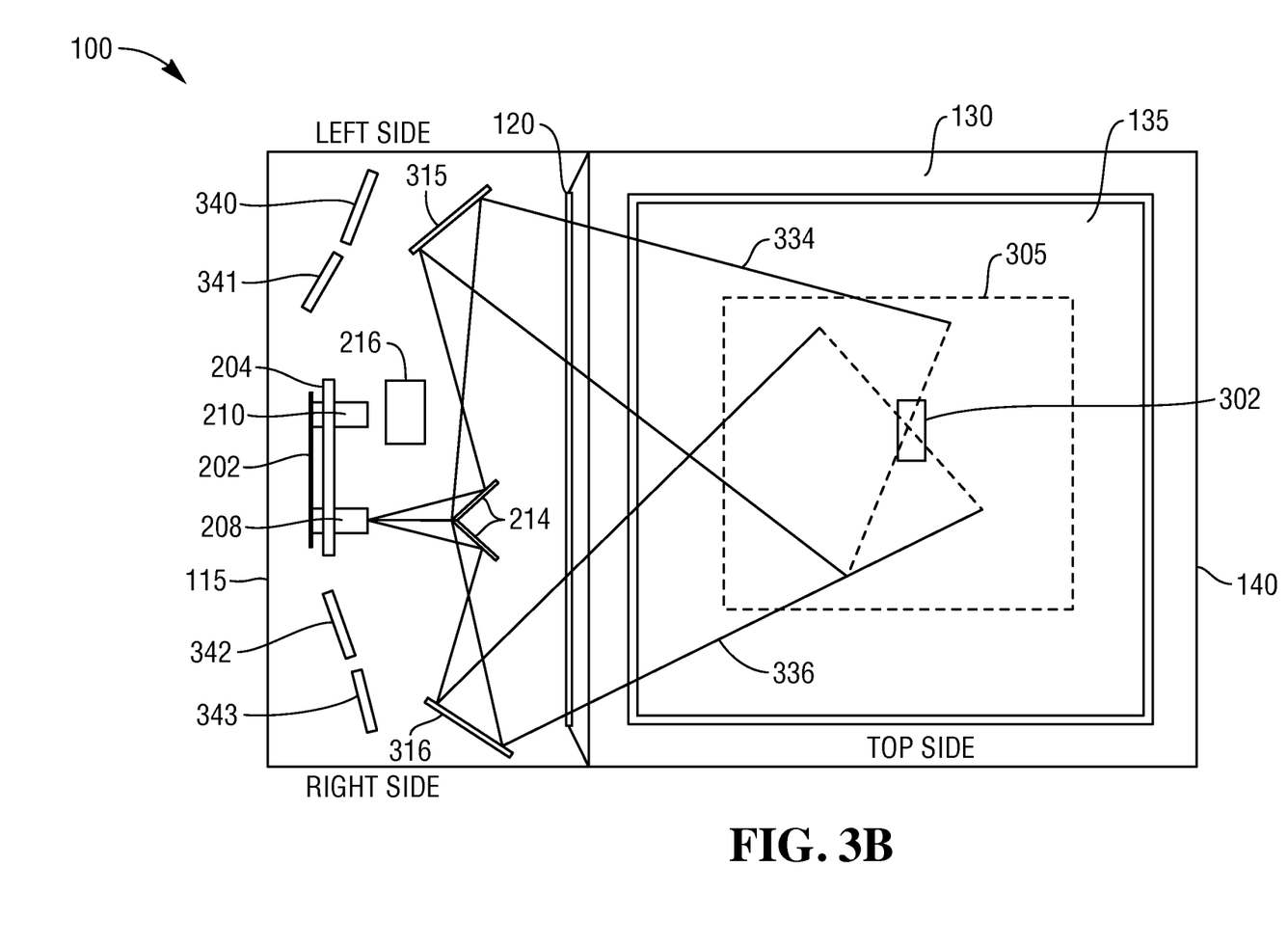

Turning now to FIGS. 3A-3B, there are provided two high-level cross-sectional diagrams illustrating two different views of the scanner 100. These illustrations show a number of different image scanning paths to an item 302 that has an optical code and that is moved through a scanning volume 305 of the scanner 100.

FIG. 3A depicts a cross-sectional diagram from the left side of the scanner 100. In this diagram, a top/down image path 330 is received through the vertical scanning window 120 and reflected off a first secondary mirror 310 to the first primary mirror 212 and then into the first image capture device 206 where the image is captured. The dashed line across the end of the top/down image scanning path 330 represents the middle of the depth of field for this path. The item could be closer or farther away from the dashed line and the optical code on the item 330 can still be read. Also in this diagram, a vertical or bottom/up image scanning path 332 is received through the vertical scanning window 120 and reflected off a fourth secondary mirror 312 to the third primary mirror 216 and into the third image capture device 210. The third image capture device 210 is oriented to receive the image from the vertical image scanning path 332 in portrait format. This provides a larger vertical scanning volume. In some embodiments, the image from the top/down image path 330 is received by the first image capture device 206 in landscape format. This provides a larger horizontal scanning volume.

FIG. 3B depicts a cross-sectional diagram looking down on the scanner 100. In this diagram, the second image capture device 208 receives and captures two different images simultaneously. One image is received from the left side of the scanner 100. This image is received from a left image scanning path 334 and is reflected by a second secondary mirror 315 to the left side of the second primary mirror 214 and then into the second image capture device 208. A second image is received from a right image scanning path 336 and is reflected by a third secondary mirror 316 to the right side of the second primary mirror 214 and then into the second image capture device 208. Each image captured by the second image capture device 208 is actually two images. Half of the captured image is the image received from the left side of the scanner 100 and the other half is the image received from the right side of the scanner 100. When items are moved through the scanning volume 305 from the left side to the right side, the right image path 336 captures images of the leading face of the item 302 and the left image path 334 captures images of the trailing face of the item 302. Both the right and left image scanning paths 334, 336 also capture images of the side of the item 302 oriented toward the vertical scanning window 120.

Each of the four image scanning paths 330, 332, 334, 336 is focused on a specific region of the scanning volume 305 so that the corresponding image capture device 206, 208, 210 will capture an image from the region.

The scanner 100 further includes four illumination modules 340, 341, 342, 343. Each module 340, 341, 342, 343 includes a plurality of illumination devices. Each of the plurality of illumination devices may suitably include a light emitting diode (LED) that generates light which is directed through the vertical scanning window 120. Each LED is computer controllable and can be turned on and off for different periods of time. The output power of each LED can also be controlled.

Each of the illumination modules 340, 341, 342, 343 is directed to illuminate the scanning volume 305 from a different direction. Illumination modules 341 and 342 are located within the upper portion of the vertical housing component 115 on either side of the camera assembly 200 and they direct light toward the vertical center of the scanning volume 305. Illumination modules 340 and 343 are located within the lower portion of the vertical housing component 115 closer to the sides of the vertical housing component 115 and they direct light to either side of the vertical center of the scanning volume 305. The illumination modules 340, 341, 342, 343 are turned on when any one of the image capture devices 206, 208, 210 capture an image. Each of the four image scanning paths 330, 332, 334, 336 is illuminated by one or more of the illumination modules 340, 341, 342, 343.

Figure 4:
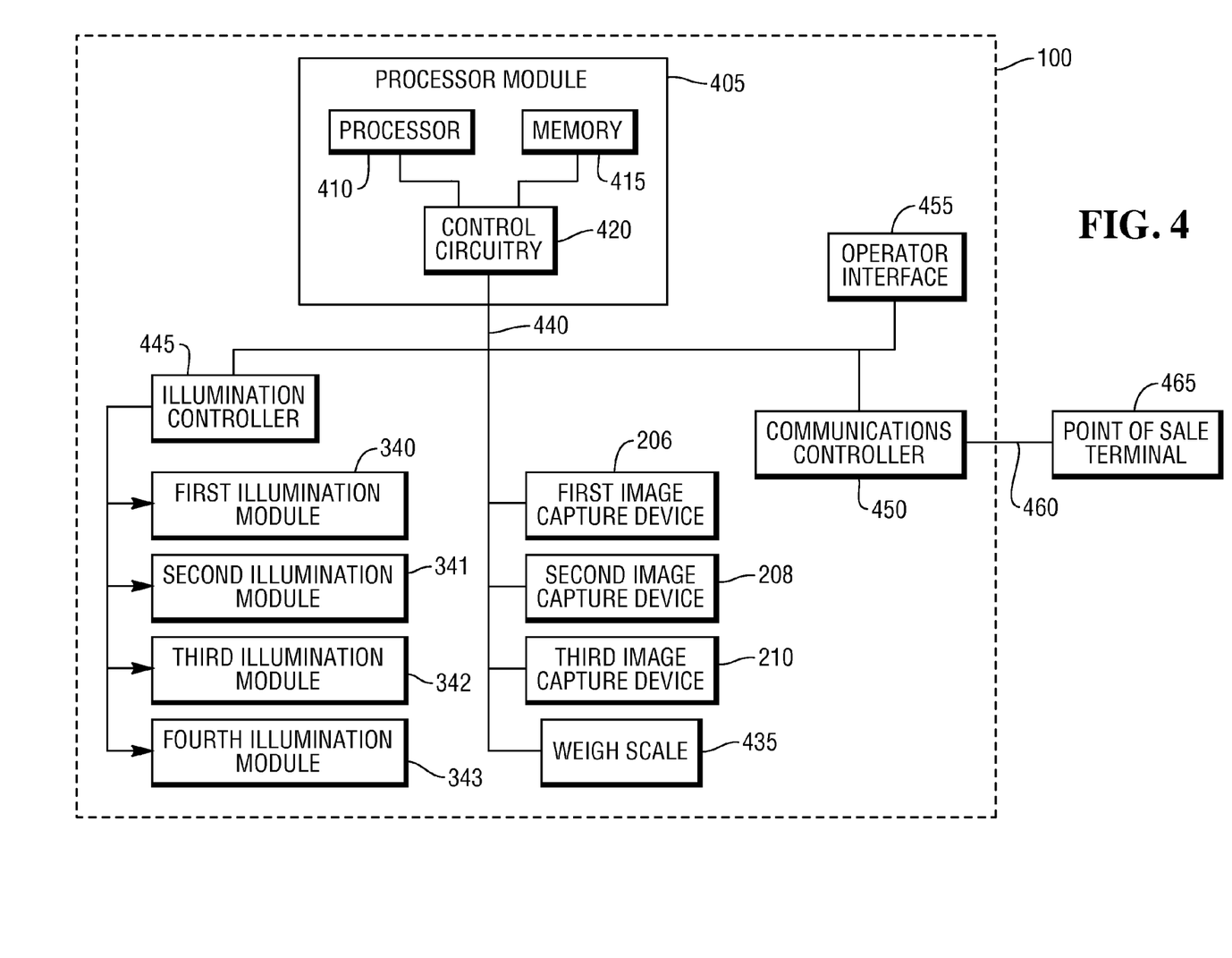
FIG. 4 is a high-level block diagram illustrating selected hardware components of the optical code scanner.

With reference to FIG. 4, there is provided a high-level block diagram illustrating an exemplar embodiment of certain hardware components of the scanner 100. The scanner 100 includes a processor module 405 that includes a processor 410, a memory 415, and control circuitry 420. The memory 415 is non-transitory and computer readable. The memory 415 includes both volatile and non-volatile memory. The non-volatile memory may suitably include solid state and/or rotating memory devices. The processor 410 executes computer instructions, embodied as software, stored in the memory 415 which when executed by the processor 410 cause the processor 410 to control the components of the scanner 100 and to implement the features and functions of the scanner 100.

The control circuitry 420 includes hardware interfaces between the processor 410 and the memory 415 and between the processor 410 and a bus 440 used to communicate with other components of the scanner 100. The scanner 100 further includes an illumination controller 445, an operator interface 455 and a communications controller 450. The bus 440 connects the processor 410 to the first image capture device 206, the second image capture device 208, the third image capture device 210, the weigh scale 435, the operator interface 455 and the communications controller 450 such that the processor 410 can communicate with and control each of them.

The illumination controller 445 controls the four illumination modules 340, 341, 342, 343. The processor 410 causes the illumination controller 445 to control each of the illumination modules 340, 341, 342, 343. Controlling the illumination modules 340, 341, 342, 343 includes turning each of the plurality of illumination devices on or off and setting the output power of each device. The illumination devices 340, 341, 342, 343 are in general only turned on for short periods of time when an image is being captured and then turned off.

The communications controller 450 includes the hardware and software required for the scanner 100 to connect to and communicate over an external network 460 to a point of sale terminal 465. In some embodiments, the network 460 is implemented as a universal system bus (USB). In other embodiments, the network 460 is implemented as an RS-232 interface. In other embodiments, the scanner 100 communicates over the network 460 to different types of apparatuses or systems.

The operator interface 455 includes input devices, such as buttons and an output device such as one or more LEDs associated with the different functions and a speaker that produces audible sounds associated with different functions all of which are used to communicate information to the operator.

The processor 410 controls each of the image capture devices 206, 208, 210 which includes causing them to capture an image. The processor 410 further reads and processes captured image data from each of the image capture devices 206, 208, 210. Optical code data recovered from captured image data is transmitted to point of sale terminal 465. When the scanner is operated in pass-by mode, the processor 410 causes the image capture devices 206, 208, 210 to capture at least 40 images per second which are then processed to read an optical code. Pass-by mode means that items presented for scanning are moved relatively quickly through the scanning volume 305, one at a time. The scanner 100 may suitably be operated in presentation mode where an item is moved into the scanning volume 305 but is held in a predetermined location until an image is captured and processed. The scanner 100 produces an indication to the user when the image is captured and processed. An optical code may also be recovered from the image. The presentation mode may suitably be used to capture an image of documents such as a driver's license or other form of identification or of coupons. The scanner 100 can be switched by the processor 410 between the pass-by mode and presentation mode as required.

Figure 5:
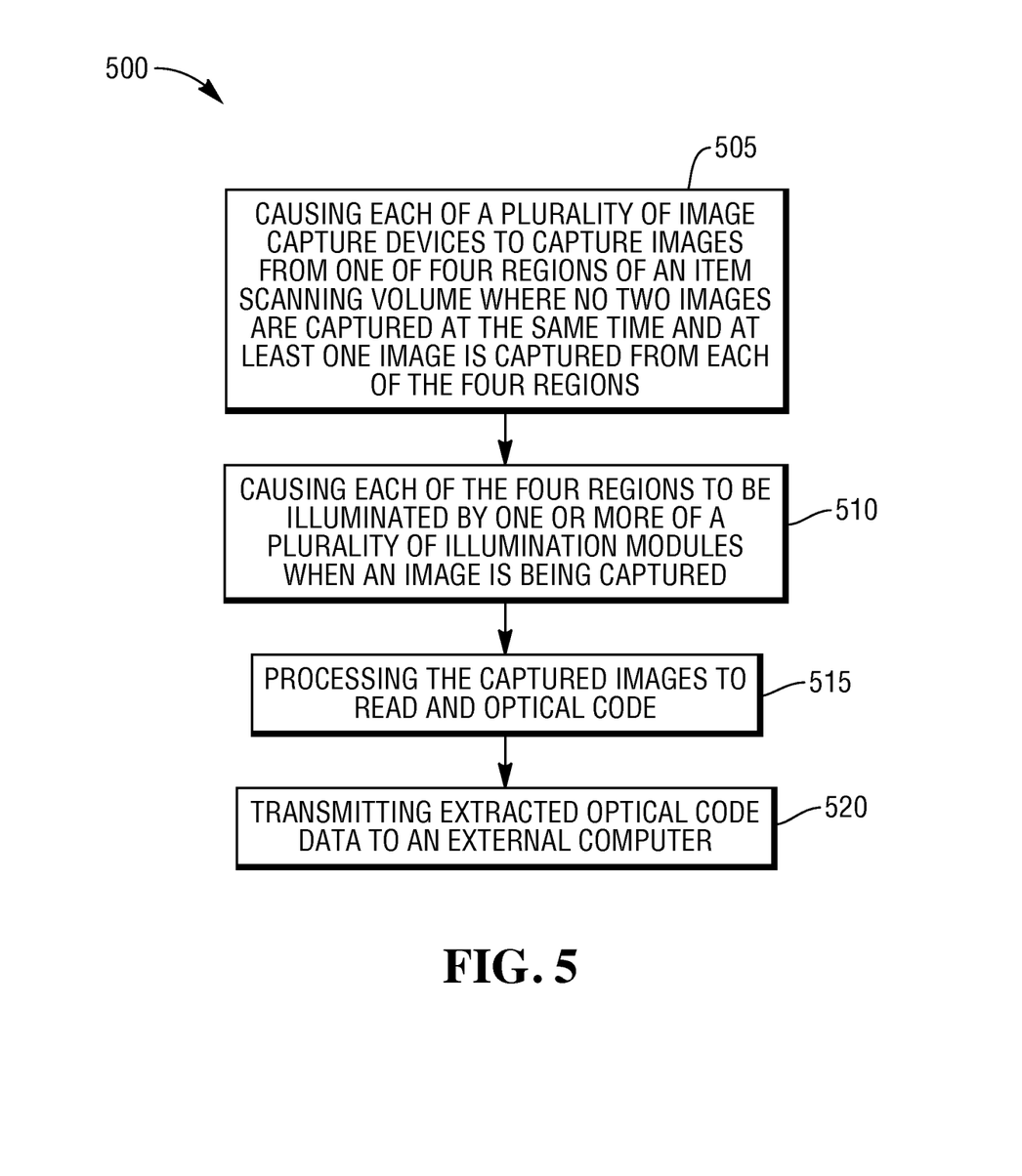
FIG. 5 is a high-level flow diagram illustrating a method of operating the optical code scanner.

With reference to FIG. 5, there is presented a high-level flow diagram illustrating a method 500 of operating the optical code scanner 100 to scan an optical code. The following method 500 describes one embodiment of the optical code scanner 100 and one method of operating the optical code scanner 100 to read an optical code. The method 500 is implemented by the processor 410 when the processor 410 executes computer instructions stored in the memory 415.

In step 505, the processor 410 causes each of the plurality of the image capture devices 206, 208, 210 to, in series, capture images from one of four regions of the item scanning volume 305 where no two images are captured at the same time and at least one image is captured from each of the four regions. The first image capture device 206 captures a top/down image which is the first region of the four regions. The second image capture device 208 captures two images simultaneously as one image. One of the two images is from the leading side of an item being scanned and is the second region and the second image is from the trailing side of an item being scanned and is the third region. The third image capture device 210 captures a vertical image which is the fourth region of the four regions.

In step 510, the processor 410 causes each of the four regions to be illuminated by one or more of the plurality of illumination modules 340, 341, 342, 343 when an image is being captured from the region. Prior to capturing an image from one of the four regions, the processor 410 turns on the illumination devices for one or more of the illumination modules 340, 341, 342, 343 that direct light to the region. In some cases, all the illumination devices will be turned on but in other cases less than all the illumination devices are turned on. Additionally, the illumination devices are only turned on while an image is being captured. After an image is captured, the illumination devices are turned off until needed again. In some embodiments where all the illumination devices are turned on to capture an image, the processor 410 reduces the output power of the illumination devices to reduce specular reflections.

In step 515, the processor 410 processes the captured images to read or extract optical code data from an optical code. In some embodiments, when specular reflections are detected, the processor 410 will cycle through the illumination modules 340, 341, 342, 343 turning one or more off and then capturing more images in an attempt to reduce the specular reflections and successfully read an optical code.

In step 520, the processor 410 transmits the extracted optical code data to an external computer over the external network 460. In this embodiment, the optical code data is transmitted to the point of sale terminal 465.

Although the present invention has been described with particular reference to certain preferred embodiments thereof, variations and modifications of the present invention can be effected within the spirit and scope of the following claims.

What is claimed is:

1. An optical code scanner comprising:
   a vertical housing including an optically transparent vertical window facing an item scanning volume of the optical code scanner;
   a plurality of secondary fixed mirrors located within and attached to the vertical housing; and
   three image capture devices and a plurality of primary fixed mirrors all attached to a camera module that is located within and attached to the vertical housing where the plurality of secondary fixed mirrors are positioned to direct images from four regions of the item scanning volume of the optical code scanner to the plurality of primary fixed mirrors and to the three image capture devices;
   wherein the plurality of primary fixed mirrors are arranged to direct: i) a top-down image of the item scanning volume to a first of the three image capture devices, ii) two separate images from two of the four regions to a second of the three image capture devices, wherein the two separate images are directed from opposite sides of the vertical housing, and wherein the two separate images are presented to the second image capture device as a single image having a first half of the single image representing one direction for the item scanning volume and a second half of the single image representing an opposite direction for the item scanning volume, and iii) a vertical image directed from a lower portion of the vertical housing to a third of the three image capture devices.

2. The optical code scanner of claim 1, further including a plurality of illumination modules that direct generated light to the four regions of the item scanning area.

3. The optical code scanner of claim 2, further comprising:
   a digital memory wherein computer instructions are stored; and
   a computer processor in communication with the memory where when the processor executes the computer instructions, the computer instructions cause the processor to perform the following step:
      causing each of the three image capture devices to capture images from one of the four regions of the item scanning area where no two images image capture devices are captured activated at the same time and at least one image is captured from each of the four regions.

4. The optical code scanner of claim 3, where the processor further performs the following step:
   causing each of the four regions to be illuminated by one or more of the plurality of illumination modules when an image is being captured.

5. The optical code scanner of claim 3, where the processor further performs the following step:
   processing the images to read an optical code.

6. The optical code scanner of claim 3, wherein causing the three image capture devices to capture images further includes causing the three image capture devices to capture at least 40 images per second.

7. The optical code scanner of claim 1, where the four regions of the item scanning area include a leading area, a trailing area, a vertical area and a top/down area.

8. The optical code scanner of claim 7, where images directed from the vertical area are captured in portrait format.

9. The optical code scanner of claim 1, where each of the three image capture devices includes a black and white image sensor.

10. The optical code scanner of claim 1, where each of the three image capture devices includes an image sensor with a global shutter for capturing an image.

11. A method of operating an optical code scanner implemented by a digital processor located within the optical code scanner, the method comprising:
   causing each of three image capture devices to capture images from one of four regions of an item scanning area of the optical code scanner using a plurality of primary fixed mirrors, where no two images image capture devices are captured activated at the same time and at least one image is captured from each of the four regions, where one of the image capture devices uses two or more of the primary fixed mirrors to capture a combined image having a first portion from one of the regions and a second portion different than the first portion from another of the regions, and wherein causing further includes arranging the plurality of fixed mirrors for directing: i) a top-down image of the item scanning area to a first of the three image capture devices, ii) two separate images from two of the four regions to a second of the three image capture devices, wherein the two separate images are directed from opposite sides of the item scanning area, and wherein the two separate images are presented to the second image capture device as a single image having a first half of the single image representing one direction for the item scanning area and a second half of the single image representing an opposite direction for the item scanning area, and iii) a vertical image directed from a lower portion of the item scanning area to a third of the three image capture devices;

causing each of the four regions to be illuminated by one or more of the plurality of illumination modules when an image is being captured; and processing the captured images to read an optical code.

12. The method of claim 11, further comprising:
operating the optical code scanner in pass-by scanning mode wherein the three image capture devices capture at least 40 images per second.

13. The method of claim 11, further comprising:
operating the optical code scanner in presentation scanning mode wherein one of the three image capture devices captures an image of an item positioned in a predetermined location in one of the four regions.

14. The method of claim 11, wherein the four regions of the item scanning area include a leading area, a trailing area, a vertical area and a top/down area.

15. The method of claim 14, wherein images captured from the vertical area are captured in portrait format.

16. The method of claim 11, wherein each of the three image capture devices include a black and white image sensor.

17. The method of claim 11, wherein each of the three image capture devices include an image sensor with a global shutter for capturing an image.

18. The method of claim 11, further comprising:
turning off one or more of the plurality of illumination devices when not actively being used to illuminate one of the four regions to capture an image.

19. The method of claim 11, further comprising:
transmitting data for the read optical code to an external computer.

* * * * *